(12) United States Patent
Bhide et al.

(10) Patent No.: US 11,474,880 B2
(45) Date of Patent: Oct. 18, 2022

(54) NETWORK STATE SYNCHRONIZATION FOR WORKLOAD MIGRATIONS IN EDGE DEVICES

(71) Applicant: Pensando Systems Inc., Milpitas, CA (US)

(72) Inventors: Parag Dattatraya Bhide, San Ramon, CA (US); Ratnananda Ganesh Dontula Venkata, Dublin, CA (US); Prabu Thayalan, San Jose, CA (US); Barun Halder, San Jose, CA (US); Rohan Sikdar, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 0 days.

(21) Appl. No.: 17/074,412

(22) Filed: Oct. 19, 2020

(65) Prior Publication Data

US 2022/0121503 A1  Apr. 21, 2022

(51) Int. Cl.
*G06F 9/50* (2006.01)
*G06F 9/455* (2018.01)
*G06F 9/48* (2006.01)
*H04L 67/1095* (2022.01)
*H04L 67/289* (2022.01)

(52) U.S. Cl.
CPC ........ *G06F 9/5088* (2013.01); *G06F 9/45558* (2013.01); *G06F 9/4856* (2013.01); *H04L 67/1095* (2013.01); *H04L 67/289* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 8,190,769 | B1 |   | 5/2012  | Shukla et al. |
|-----------|----|---|---------|---------------|
| 8,565,118 | B2 |   | 10/2013 | Shukla et al. |
| 9,197,489 | B1 |   | 11/2015 | Vincent       |
| 9,672,054 | B1 |   | 6/2017  | Gupta et al.  |
| 10,235,199 | B2 | * | 3/2019  | Zhang ................ G06F 9/455 |
| 10,275,162 | B2 |   | 4/2019  | Kan et al.    |
| 10,725,885 | B1 | * | 7/2020  | Paraschiv ........... G06F 11/3433 |
| 10,846,145 | B2 |   | 11/2020 | Xu et al.     |

(Continued)

*Primary Examiner* — Younes Naji
(74) *Attorney, Agent, or Firm* — Patterson + Sheridan, LLP

(57) ABSTRACT

Described are edge devices configured to perform operations to migrate a workload. These operations comprise: receiving a migration trigger comprising an indication of a migration of a workload from a source edge device; establishing a secure communication channel with the source edge device; receiving a network state for the workload from the source edge device; quiescing a datapath for processing flows associated with the workload; receiving incremental deltas comprising changes to the network state from the source edge device; updating the datapath for processing flows associated with the workload based on the received incremental changes; providing, to the source edge device, a request for a final synchronization; receiving, from the source edge device, a final synchronization delta comprising incremental information for the network state as modified since the most recently received incremental change; and removing the quiescing of the datapath to facilitate use of the network state.

33 Claims, 6 Drawing Sheets

(56) References Cited

U.S. PATENT DOCUMENTS

| | | | |
|---|---|---|---|
| 10,922,132 B1* | 2/2021 | Shiramshetti | G06F 21/53 |
| 2014/0068018 A1* | 3/2014 | Roh | H04L 67/1095 |
| | | | 709/219 |
| 2015/0381589 A1 | 12/2015 | Tarasuk-Levin et al. | |
| 2017/0359414 A1* | 12/2017 | Sengupta | G06F 9/45558 |
| 2018/0139101 A1 | 5/2018 | Puri et al. | |
| 2018/0189087 A1* | 7/2018 | Palermo | H04L 67/142 |
| 2020/0358867 A1* | 11/2020 | Jain | H04L 67/1001 |
| 2020/0379805 A1* | 12/2020 | Porter | G06F 9/5061 |
| 2021/0021619 A1* | 1/2021 | Smith | H04L 67/104 |

\* cited by examiner

NETWORK STATE SYNCHRONIZATION FOR WORKLOAD MIGRATIONS IN EDGE DEVICES

BACKGROUND

Network traffic refers to the amount of data moving across a network at a given point of time. Network data is mostly encapsulated in network packets, which provide the load in the network. Network traffic is the main component for network traffic measurement, network traffic control, and simulation. The proper organization of network traffic helps in ensuring the quality of service in a given network.

SUMMARY

Computing environments may include hosts running one or more workloads. The hosts and/or processes may be configured to communicate with other processes or devices over a data network. The host systems may interface with the data network via a smart edge device. An edge device provides networking/policy enforcement/security to transactions between workloads by, for example, maintaining a state for each of the transactions between these workloads, along with policies. Edge devices include stand-alone devices (e.g., firewall appliances) and integrated input/output (IO) devices (e.g., network interface cards (NICs)).

Described herein, in certain embodiments, are systems employing an edge device to synchronize network states associated with respective migrating workloads. These network states synchronizing systems provide uninterrupted stateful monitoring and policy based services during workloads live migration from one intelligent-edge device to another.

Accordingly, in one aspect, disclosed herein are edge devices each configured to execute instructions that cause the edge device to perform operations to migrate a workload, the operations comprising: receiving a migration trigger comprising an indication of a migration of a workload from a source edge device to the edge device; establishing a secure communication channel with the source edge device; receiving a network state for the workload from the source edge device via the secure communication channel; quiescing a datapath for processing flows associated with the workload based on the received network state; receiving incremental deltas comprising changes to the network state from the source edge device via the secure communication channel; updating the datapath for processing flows associated with the workload based on the received incremental changes; providing, to the source edge device via the secure communication channel, a request for a final synchronization; receiving, from the source edge device via the secure communication channel, a final synchronization delta comprising incremental information for the network state as modified since the most recently received incremental change; and removing the quiescing of the datapath to facilitate use of the network state by receiving traffic packets from the migrated workload. In some embodiments, the operations comprise: after removing the quiescing of the datapath, allowing any held up traffic packets from the migrated workload out to a network. In some embodiments, the migration trigger is received by processing network packets in the data plane. In some embodiments, the network packets comprises attributes associated with the source edge device. In some embodiments, the operations comprise identifying the source edge device based on the attributes associated with the source edge device. In some embodiments, the attributes comprise a media access control (MAC) address or an internet protocol (IP) address, associated with the source edge device. In some embodiments, the migration trigger is received from a workload orchestrator. In some embodiments, the workload orchestrator provides control information for the workload via the control plane. In some embodiments, the operations comprise: providing, to the source edge device, an acknowledgement that the workload has been migrated. In some embodiments, the edge device comprises a programmable IO device. In some embodiments, the edge device comprises a smart network interface card smartNIC. In some embodiments, the operations comprise: after receiving the final synchronization delta, providing, to the source edge device via the secure communication channel, an ACK message. In some embodiments, the operations comprise: storing, in a memory, the network state such that it does not affect forwarding, policy, security decisions. In some embodiments, the network state comprises policy state data, security state data, flow state data, stateful firewall data, and connection tracking information for each of the flows. In some embodiments, one or more interfaces are mapped to the workload. In some embodiments, each of the one or more interfaces comprise a context for the workload. In some embodiments, the network state comprises each of the contexts.

In a related yet separate aspect, disclosed herein are edge devices each configured to execute instructions that cause the edge device to perform operations to migrate a workload, the operations comprising: receiving a synchronization request for a workload from a destination edge device; establishing a secure communication channel with the destination edge device; providing a network state for the workload to the destination edge device via the secure communication channel; providing incremental deltas comprising changes to the network state to the destination edge device via the secure communication channel; receiving a request for a final synchronization from the destination edge device via the secure communication channel; quiescing a datapath for processing the flows associated with the workload; providing, to the destination edge device via the secure communication channel, a final synchronization delta comprising incremental information for the network state as modified since the most recently received incremental change; and deleting any sessions, flows, and workload context, associated with the workload. In some embodiments, the operations comprise: after providing the final synchronization delta to the destination edge device, receiving an ACK message from the destination edge device via the secure communication channel. In some embodiments, the edge device comprises a smartNIC. In some embodiments, the network state comprises policy state data, security state data, flow state data, stateful firewall data, and connection tracking information for each of the flows associated with the workload. In some embodiments, the synchronization request is provided by the destination edge device based on a migration trigger received from a workload orchestrator. In some embodiments, the workload orchestrator provides control information for the workload via the control plane.

In a related yet separate aspect, disclosed herein are network state synchronization systems comprising: a destination edge device; and a source edge device. In some embodiments, the destination edge device is configured to: receive a migration trigger comprising an indication of a migration of a workload from the source edge device to the destination edge device; provide a synchronization request for the workload to the source edge device; establish a secure communication channel with the source edge device; receive a network state for the workload from the source edge device via the secure communication channel; quiesce a destination datapath for processing flows associated with the workload based on the received network state; receive incremental deltas comprising changes to the network state from the source edge device via the secure communication channel; update the destination datapath for processing flows associated with the workload based on the received incremental changes; provide, to the source edge device via the secure communication channel, a request for a final synchronization; receive, from the source edge device via the secure communication channel, a final synchronization delta comprising incremental information for the network state as modified since the most recently received incremental change; and remove the quiescing of the destination datapath to facilitate use of the network state by receiving traffic packets from the migrated workload. In some embodiments, the source edge device is configured to: receive the synchronization request for the workload from the destination edge device; establish the secure communication channel with the destination edge device; provide the network state for the workload to the destination edge device via the secure communication channel; provide the incremental deltas to the destination edge device via the secure communication channel; receive the request for a final synchronization from the destination edge device via the secure communication channel; quiesce a source datapath for processing the flows associated with the workload; provide, to the destination edge device via the secure communication channel, the final synchronization delta; and delete any sessions, flows, and workload context, associated with the workload. In some embodiments, the destination edge device is configured to: after removing the quiescing of the datapath, allow any held up traffic packets from the migrated workload out to a network. In some embodiments, the migration trigger is received by processing network packets in the data plane. In some embodiments, the network packets comprises attributes associated with the source edge device. In some embodiments, the destination edge device is configured to: identify the source edge device based on the attributes associated with the source edge device. In some embodiments, the attributes comprise a MAC address or an IP address, associated with the source edge device. In some embodiments, the migration trigger is received from a workload orchestrator. In some embodiments, the workload orchestrator provides control information for the workload via the control plane. In some embodiments, the destination edge device is configured to: provide, to the source edge device, an acknowledgement that the workload has been migrated. In some embodiments, the destination edge device is configured to: after receiving the final synchronization delta, provide, to the source edge device via the secure communication channel, an ACK message. In some embodiments, the destination edge device is configured to: store, in a memory, the network state such that it does not affect forwarding, policy, security decisions. In some embodiments, the network state comprises policy state data, security state data, flow state data, stateful firewall data, and connection tracking information for each of the flows. In some embodiments, one or more interfaces are mapped to the workload. In some embodiments, each of the one or more interfaces comprise a context for the workload. In some embodiments, the network state comprises each of the contexts. In some embodiments, the source device is configured to: after providing the final synchronization delta to the destination edge device, receiving an ACK message from the destination edge device via the secure communication channel. In some embodiments, the destination edge device comprises a programmable IO device. In some embodiments, the source edge device comprises a programmable IO device. In some embodiments, the destination edge device comprises a smart network interface card smartNIC. In some embodiments, the source edge device comprises a smart network interface card smartNIC.

In a related yet separate aspect, disclosed herein are methods for migrating a workload. These the methods are executed by an edge device and comprise: receiving a migration trigger comprising an indication of a migration of a workload from a source edge device to the edge device; establishing a secure communication channel with the source edge device; receiving a network state for the workload from the source edge device via the secure communication channel; quiescing a datapath for processing flows associated with the workload based on the received network state; receiving incremental deltas comprising changes to the network state from the source edge device via the secure communication channel; updating the datapath for processing flows associated with the workload based on the received incremental changes; providing, to the source edge device via the secure communication channel, a request for a final synchronization; receiving, from the source edge device via the secure communication channel, a final synchronization delta comprising incremental information for the network state as modified since the most recently received incremental change; and removing the quiescing of the datapath to facilitate use of the network state by receiving traffic packets from the migrated workload. In some embodiments, the methods comprise: after removing the quiescing of the datapath, allowing any held up traffic packets from the migrated workload out to a network. In some embodiments, the migration trigger is received by processing network packets in the data plane. In some embodiments, the network packets comprises attributes associated with the source edge device. In some embodiments, the methods comprise identifying the source edge device based on the attributes associated with the source edge device. In some embodiments, the attributes comprise a MAC address or an IP address, associated with the source edge device. In some embodiments, the migration trigger is received from a workload orchestrator. In some embodiments, the workload orchestrator provides control information for the workload via the control plane. In some embodiments, the methods comprise: providing, to the source edge device, an acknowledgement that the workload has been migrated. In some embodiments, the edge device comprises a programmable IO device. In some embodiments, the edge device comprises a smart network interface card smartNIC. In some embodiments, the methods comprise: after receiving the final synchronization delta, providing, to the source edge device via the secure communication channel, an ACK message. In some embodiments, the methods comprise: storing, in a memory, the network state such that it does not affect forwarding, policy, security decisions. In some embodiments, the network state comprises policy state data, security state data, flow state data, stateful firewall data, and connection tracking information for each of the flows. In some embodiments, one or more interfaces are mapped to the workload. In some embodiments, each of the one or more interfaces comprise a context for the workload. In some embodiments, the network state comprises each of the contexts.

In a related yet separate aspect, disclosed herein are methods for migrating a workload. These the methods are executed by an edge device and comprise: receiving a synchronization request for a workload from a destination edge device; establishing a secure communication channel with the destination edge device; providing a network state for the workload to the destination edge device via the secure communication channel; providing incremental deltas comprising changes to the network state to the destination edge device via the secure communication channel; receiving a request for a final synchronization from the destination edge device via the secure communication channel; quiescing a datapath for processing the flows associated with the workload; providing, to the destination edge device via the secure communication channel, a final synchronization delta comprising incremental information for the network state as modified since the most recently received incremental change; and deleting any sessions, flows, and workload context, associated with the workload. In some embodiments, the methods comprise: after providing the final synchronization delta to the destination edge device, receiving an ACK message from the destination edge device via the secure communication channel. In some embodiments, the edge device comprises a smartNIC. In some embodiments, the network state comprises policy state data, security state data, flow state data, stateful firewall data, and connection tracking information for each of the flows associated with the workload. In some embodiments, the synchronization request is provided by the destination edge device based on a migration trigger received from a workload orchestrator. In some embodiments, the workload orchestrator provides control information for the workload via the control plane.

Advantages of the described network state synchronization system include: reducing traffic disruption in workload migrations and minimizing packet loss and the number of dropped packets during workload migration.

It shall be understood that different aspects of the described system can be appreciated individually, collectively, or in combination with each other. Various aspects of the systems described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
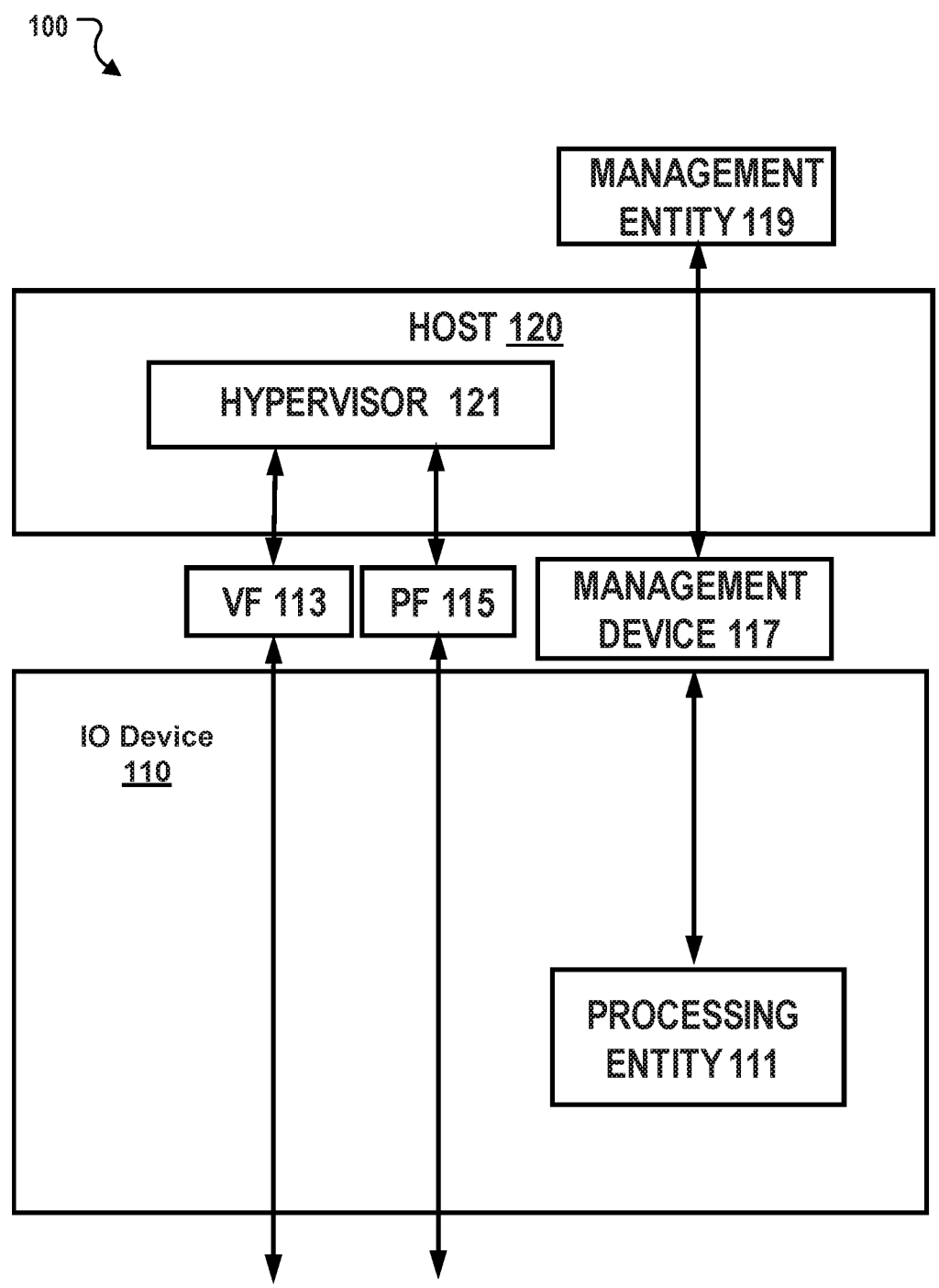
FIG. 1 depicts a non-limiting exemplary computing system architecture that may be employed by embodiments of the present disclosure.

Described herein, in certain embodiments, are edge devices each configured to execute instructions that cause the edge device to perform operations to migrate a workload, the operations comprising: receiving a migration trigger comprising an indication of a migration of a workload from a source edge device to the edge device; establishing a secure communication channel with the source edge device; receiving a network state for the workload from the source edge device via the secure communication channel; quiescing a datapath for processing flows associated with the workload based on the received network state; receiving incremental deltas comprising changes to the network state from the source edge device via the secure communication channel; updating the datapath for processing flows associated with the workload based on the received incremental changes; providing, to the source edge device via the secure communication channel, a request for a final synchronization; receiving, from the source edge device via the secure communication channel, a final synchronization delta comprising incremental information for the network state as modified since the most recently received incremental change; and removing the quiescing of the datapath to facilitate use of the network state by receiving traffic packets from the migrated workload.

Also described herein, in certain embodiments, are edge devices each configured to execute instructions that cause the edge device to perform operations to migrate a workload, the operations comprising: receiving a synchronization request for a workload from a destination edge device; establishing a secure communication channel with the destination edge device; providing a network state for the workload to the destination edge device via the secure communication channel; providing incremental deltas comprising changes to the network state to the destination edge device via the secure communication channel; receiving a request for a final synchronization from the destination edge device via the secure communication channel; quiescing a datapath for processing the flows associated with the workload; providing, to the destination edge device via the secure communication channel, a final synchronization delta comprising incremental information for the network state as modified since the most recently received incremental change; and deleting any sessions, flows, and workload context, associated with the workload.

Also described herein, in certain embodiments, are network state synchronization systems comprising: a destination edge device; and a source edge device. In some embodiments, the destination edge device is configured to: receive a migration trigger comprising an indication of a migration of a workload from the source edge device to the destination edge device; provide a synchronization request for the workload to the source edge device; establish a secure communication channel with the source edge device; receive a network state for the workload from the source edge device via the secure communication channel; quiesce a destination datapath for processing flows associated with the workload based on the received network state; receive incremental deltas comprising changes to the network state from the source edge device via the secure communication channel; update the destination datapath for processing flows associated with the workload based on the received incremental changes; provide, to the source edge device via the secure communication channel, a request for a final synchronization; receive, from the source edge device via the secure communication channel, a final synchronization delta comprising incremental information for the network state as modified since the most recently received incremental change; and remove the quiescing of the destination datapath to facilitate use of the network state by receiving traffic packets from the migrated workload. In some embodiments, the source edge device is configured to: receive the synchronization request for the workload from the destination edge device; establish the secure communication channel with the destination edge device; provide the network state for the workload to the destination edge device via the secure communication channel; provide the incremental deltas to the destination edge device via the secure communication channel; receive the request for a final synchronization from the destination edge device via the secure communication channel; quiesce a source datapath for processing the flows associated with the workload; provide, to the destination edge device via the secure communication channel, the final synchronization delta; and delete any sessions, flows, and workload context, associated with the workload.

Certain Definitions

Unless otherwise defined, all technical terms used herein have the same meaning as commonly understood by one of ordinary skill in the art to which this described system belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the appearances of the phrase "in some embodiments," or "in an embodiment," in various places throughout this specification are not necessarily all referring to the same embodiment. Furthermore, the particular features, structures, or characteristics may be combined in any suitable manner in one or more embodiments.

As referenced herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers. Further, these components can execute from various computer readable media having various data structures stored thereon.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, PCIe includes a high-speed serial computer expansion bus standard. In some examples, PCIe is a motherboard interface for hardware components, such as, graphics cards, hard drives, solid-state drives (SSDs), Wi-Fi and Ethernet hardware connections. PCIe is based on point-to-point topology, with separate serial links connecting every device to the root complex (host). PCIe has improvements over the older standards (e.g., Peripheral Component Interconnect (PCI), PCI eXtended (PCI-X) and Accelerated Graphics Port (AGP) bus standards), including higher maximum system bus throughput, lower input output (I/O) pin count and smaller physical footprint, better performance scaling for bus devices, a more detailed error detection and reporting mechanism (e.g., Advanced Error Reporting, (AER)), and native hot-swap functionality. More recent revisions of the PCIe standard provide hardware support for I/O virtualization.

As used herein, workload includes a collection of resources and code that performs a defined functionality. Resources can include compute, storage and one or many networking resources (virtual NICS). Example workloads includes a VM or a Container.

As used herein, a network interface includes an entity mapped to a workload that defines the attribute of the virtual NIC. One or more interfaces may be associated with a given workload. In some embodiments, attributes of an interface includes a unique name in a given workload scope, MAC address, or IP address. Such attributes can be employed to, for example, identify policy tags.

As used herein, an edge device (e.g., a smartNIC) provides networking/policy enforcement, security, and visibility to the transactions among workloads by maintaining a state and policies for the transactions associated with the workloads.

As used herein, a source device (e.g., a programmable IO device) is an edge device associated with a source host where a workload resides before migration. Prior to migration, the source host maintains a state associated with a workload that is being migrated.

As used herein, a destination device (e.g., a programmable IO device) is an edge device associated with a destination host. the Workloads are migrated to destination hosts from source hosts.

As used herein, a session represents bi-directional communication between a sender and a receiver. A session may include two flows when the communication between the sender and receiver is bidirectional. In some embodiments, sessions are associated with a given interface on a workload.

As used herein, a flow represents unidirectional communication between a sender (or initiator) and a receiver (or responder). In some embodiments, a flow includes a sequence of packets that belong to a specific transaction or communication between two workloads. Packets can be associated with a flow using included layer 2-7 information, such as IP addresses (e.g., source IP address and destination IP address), L4 protocol, port numbers, and other application identifiers. Typically, a flow is a part of a session (e.g., a session can include an initiator flow and responder flow.

As used herein, a flow state includes information about a flow that can be used to, for example, identify and validate network packets and apply predefined policies. A flow state can be identified by a network global tenant-id, Source IP, Destination IP, layer3 protocol, source port, or destination port. A flow state can include various flow data, such as policy decision (e.g., admit, deny, monitor, and so forth) and protocol state (e.g., states for protocols such as Transmission Control Protocol (TCP), File Transfer Protocol (FTP), Trivial File Transfer Protocol (TFTP), Remote Procedure Call (RPC), and so forth), A flow state may also include statistics associated with a data flow, such as packets or bytes that are sent or received.

IO Devices

Computer systems employ a wide variety of peripheral components or IO devices (e.g., edge devices, such as smartNICs). For example, a host processor of a computer system can be connected to IO devices through a component bus defined by PCIe, which is a high-speed serial computer expansion bus standard. Device drivers (also referred to drivers) are hardware-specific software which controls the operation of hardware devices connected to computing systems.

In computing, virtualization techniques are used to allow multiple operating systems to simultaneously share processor resources. One such virtualization technique is Single Root I/O Virtualization (SR-IOV), which is described in the PCI-SIG Single Root I/O Virtualization and Sharing Specifications. A physical IO device may allow multiple virtual machines to use the device concurrently through SR-IOV. In SR-IOV, a physical device may have physical functions (PFs) that allow for input/output operations and device configuration, as well as one or more virtual functions (VFs) that allow for data input/output. According to SR-IOV, a PCIe device can appear to be multiple separate physical PCIe devices. For example, a SR-IOV NIC having a single port can have up to 256 virtual functions, with each virtual function representing a respective NIC port.

Smart Network Interface Card

A smart NIC (smartNIC) (also known as an intelligent server adapter (ISA)) goes beyond simple connectivity and implements network traffic processing on the NIC that would necessarily be performed by the CPU in the case of a foundational NIC. SmartNICs can be employed in cloud data center servers to boost performance by offloading operations of the CPUs of the servers by performing network datapath processing through an IO subsystem. For example, the IO subsystem provided through a SmartNIC offloads low-level operations from server CPUs to dramatically increase network and application performance. By installing smartNICs, communications service providers can deliver significantly better revenue-earning services with a small increase in investment.

With the increase in the complexity of networks and the protocols which run on them, the amount of processing that hosts must perform for networking operations has increased exponentially. This problem is amplified because, as the requirement for more network bandwidth grows, so does the need for precious host CPU time. As such, smartNICs are increasingly deployed in datacenters to offload these complex networking tasks away from the host CPU. This allows more CPU available to the applications on the host. SmartNICs include a capacity to a large amount of state data that can be used to provide advanced services, such as virtual workload implementations. SmartNICs are usually presented to the host as a PCIe device but can also be involved in offloading host CPU tasks as a bump-in-the-wire ethernet device. The advanced functions can be host agnostic as a host usually uses off the rack drivers to communicate with these devices. SmartNICs can be managed separately from the hosts by administrators who are not necessarily the same as the host administrators.

In some embodiments, smartNICs perform enhanced Layer3-Layer7 monitoring and policy applications. In some embodiments, these applications maintain an active network state for data flows to/from a workload. This network state may include protocol state, policy information, admission state, and so forth. In some embodiments, when workloads are migrated, the active network state of the workload must also be migrated to the destination entity (e.g., a destination smartNIC).

Workloads

As used herein, a workload includes a collection of resources and code that performs a defined functionality. These resources include, for example, computing, storage, and other networking resources (e.g., virtual NICs). Example workloads include a virtual machine (VM) or a container. In some embodiment, a VM is an operating system that shares the physical resources of at least one server. A VM includes several layers. For example, a hypervisor is a VM layer that enables virtualization, and can be implemented via software that virtualizes the host server(s). A container, on the other hand, is an isolated, lightweight silo for running an application on a host operating system. Containers may be built on top of the host operating system's kernel and may include applications and lightweight operating system application programming interfaces (APIs) and services.

As used herein, a network state includes state information for network protocols, firewall policies and network security. In some embodiments, a network state includes the flow state, stateful firewall information for various types of applications (e.g., FTP/TFTP/RPC), connection tracking information for each flow (e.g., sequence numbers, ack numbers, window size, and so forth) for connection oriented protocols such as TCP, flow statistics (e.g., accept/deny bytes and packet statistics information), and policy state information (e.g., when a specific flow among a set of interfaces, one of which is associated with the workload being migrated, is admitted or denied).

As used herein, a workload orchestrator includes the automation of scheduling and managing the workloads for the applications among the cluster of physical nodes. In some embodiments, workload orchestration is focused on managing the life cycle of workloads and their dynamic environments like performance, latency, and so forth. Embodiments of a workload orchestrator includes such as a load balancer, a workload scheduler, a workload resource manager, health and performance monitoring, and computer and network administration.

Workload Migration

Computing platforms that support virtual workload implementations may allow live migration of an entire running workload from one physical entity (host/server) to another, with no downtime. In such implementations, a workload retains its network identity and connections, ensuring a seamless migration process. The described system provides uninterrupted stateful monitoring and policy based services, during workload's live migration, from one intelligent-edge device to another. In some embodiments, the described system provides sub-second disruption of services, during workload migration without impacting flows established prior to migration.

Edge devices may provide stateful monitoring and policy based services for workloads. As such, these edge devices may need to migrate the network state to another intelligent-edge device to provide a seamless migration experience. Various mechanisms can be used to begin a workload migration. For example, a workload migration can be triggered by a workload orchestrator. In some embodiments, once migration begins and a destination edge device to which a workload can be transferred is identified, the destination edge device initiates a secured connection with the source edge device where the workload currently resides. In some embodiments, the state of the workload is moved with the workload. This state may include information related to, for example, the CPU, a memory state, memory storage. In some embodiments, the network state is migrated from the source edge device before the workload is ready to run at the destination edge device.

FIG. 1 depicts a block diagram of an exemplary computing system architecture 100, in accordance with embodiments of the described system. A hypervisor 121 on the host computing system 120 may interact with the physical IO device 110 (e.g., a smartNIC) using the PFs 115 and one or more VFs 113. As illustrated, the computing system 120 may comprise a management device 117 configured for management of the interface devices. The management device 117 may be in communication with a processing entity 111 (e.g., an Advanced Reduced Instruction Set Computer (RISC) Machine (ARM) processor) and a management entity 119 (e.g., management virtual machine system). It should be noted that the illustrated computing system is only an example mechanism, without suggesting any limitation as to the scope of the described system. The provided programmable IO interface and methods can be applied to any operating-system-level virtualization (e.g., container and docker system) or machine level virtualization or computing system without virtualization features.

The hypervisor 121 generally provides operating system functionality (e.g., process creation and control, file system process threads, etc.) as well as CPU scheduling and memory management for the host. In some cases, the host computing system 120 may include programs that implement a machine emulator and virtualizer. The machine emulator and virtualizer may assist in virtualizing respective computer IO devices in virtual machines, such as virtualized hard disks, compact disk drives, and NICs. Virtio is a virtualization standard for implementing virtual IO devices in a virtual machine and may be considered as an abstraction for a set of common emulated devices in a hypervisor.

In one aspect, a programmable device interface is provided via the IO device 110 (e.g., a smartNIC). The device interface may be a highly optimized ring based I/O queue interface with an efficient software programming model to deliver high performance with CPU and PCIe bus efficiency. The provided IO device interface mechanism allows for native hardware speeds when using the device emulator. The IO device interface allows the host system to interface with the edge device with existing device drivers without reconfiguration or modification. In some cases, the VF device, PF device and management device may have similar driver interface such that such devices can be supported by a single driver. Such devices may, in some cases, be referred to as Ethernet devices.

The IO device 110 may provide a variety of services and/or functionality to an operating system operating as a host on computing system 120. For example, the IO device may be configured as an edge device that provides network connectivity functions to the computing system, coprocessor functionality (e.g., graphics processing, encryption/decryption, database processing, etc.) and the like. The IO device 110 may interface with other components in the computing system 100 via, for example, a PCIe bus.

As mentioned above, SR-IOV specification enables a single root function (for example, a single Ethernet port) to appear to virtual machines as multiple physical devices. A physical IO device with SR-IOV capabilities may be configured to appear in the PCI configuration space as multiple functions. The SR-IOV specification supports physical functions and virtual functions.

Physical functions are full PCIe devices that may be discovered, managed, and configured as normal PCI devices. Physical functions configured and manage the SR-IOV functionality by assigning virtual functions. The IO device may expose one or more physical functions (PFs) 115 to a host computing system 120 or hypervisor 121. The PFs 115 may be full-featured PCIe devices that include all configuration resources and capabilities for the IO device. In some cases, the PFs may be PCIe functions that include SR-IOV extended capability, which facilitates the configuration or management of the IO device. The PF device is essentially a base controller of the Ethernet device. The PF device may be configured with up to 256 VFs. In some cases, the PFs may include extended operations such as allocating, configuring and freeing a VF, discovering hardware capabilities of the VF, such as Receive Side Scaling (RSS), discovering hardware resources of the VF, such as number of queues and interrupts resources, configuring the hardware resources and features of a VF, saving and restoring hardware state and the like. In some instances, the PF device may be configured as a boot device which may present an Option ROM base address registers (BAR).

The IO device may also provide one or more virtual functions (VFs) 113. The VFs may be lightweight PCIe functions that contain the resources necessary for data movement but may have a minimized set of configuration resources. In some cases, the VFs may include lightweight PCIe functions that support SR-IOV. To use SR-IOV devices in a virtualized system, the hardware may be configured to create multiple VFs. These VFs may be made available to the hypervisor for allocations to virtual machines. The VFs may be manipulated (e.g., created, configured, monitored, or destroyed) for example, by the SR-IOV physical function device. In some cases, each of the multiple VFs is configured with one or more BARs to map NIC resources to the host system. A VF may map one or more LIFs or port, which are used in the IO device for forwarding and transaction identification. A LIF may belong to only one VF. Within a physical device, all virtual functions may have an identical BAR resource layout, stacked sequentially in host PCIe address space. The IO device PCIe interface logic may be programmed to map control registers and NIC memory regions with programmable access permissions (e.g., read, write, execute) to the VF BARs.

The IO device 110 may comprise a management device 117 for management of the IO device. The management device 117 may not have direct access to the network uplink ports. The management device may be in communication with the processing entity 111. For example, the traffic on the management device may be steered to internal receive queues for processing by the management software on the processing entity 111. In some cases, the management device may be made available to pass through the hypervisor to a management entity 119 such as a management virtual machine. For example, the management device 117 may be assigned a device ID different from the PF device 115, such that a device driver in the hypervisor may be released for the PF device when the PF device does not claim the management device.

Figure 2:
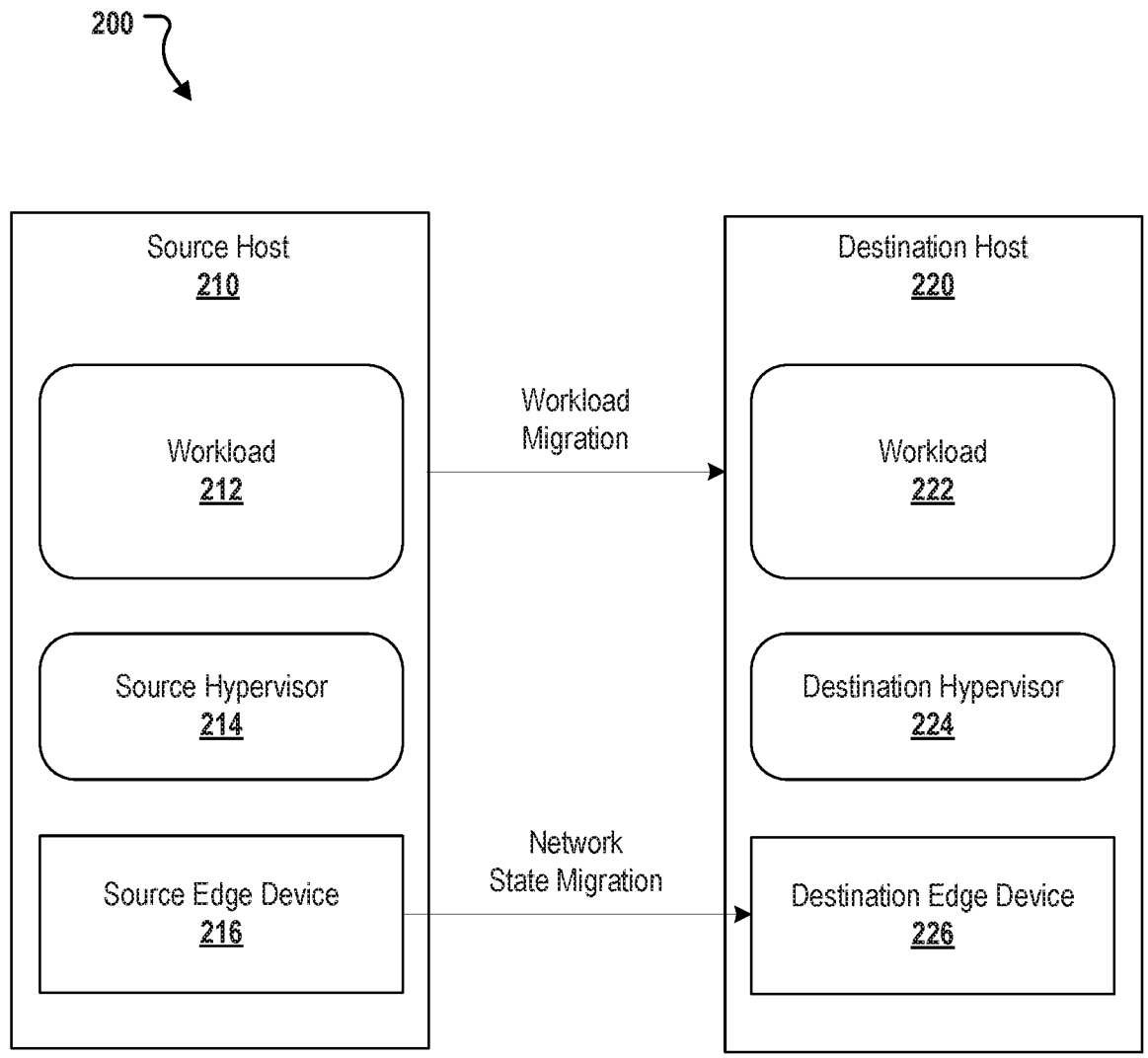
FIG. 2 depicts an exemplary computing environment employing the described system.

FIG. 2 depicts an example computing environment 200 employing the described system. As depicted, the computing environment 200 includes a source host 210 and a destination host 220. Two hosts are depicted in FIG. 2 for simplicity. It is contemplated, however, that implementations of the present disclosure can be realized with any of the appropriate number of hosts. Moreover, implementations of the present disclosure can employ any number of hosts as required. Each host includes an edge device (source edge device 216 and destination edge device 226) and hypervisor (source hypervisor 214 and destination hypervisor 224). In some embodiments, these edge devices are programmable IO devices such as a smartNIC.

As depicted, the workload 212 (e.g., a VM) is migrated from the source host 210 to the destination host 220 as workload 222 and the network state of the workload 212 is migrated from the source edge device 216 to the destination edge device 226. In some embodiments, a networking interface represents a virtual interface associated with a workload that is used to connect to the host. A workload may have one of more networking interfaces. In some embodiments, a networking interface is uniquely identified by the namespace by, for example, virtual local area network (VLAN), IP, and so forth. In some embodiments, a network interface can be identified by a combination of the name of workload, interface name, and attributes (e.g., a MAC address or IP address). In some embodiments, the context of each networking interface associated with a workload can be migrated to the destination device in parallel. For example, a workload (say VM1) may have multiple network interfaces, such as eth0, eth1, eth2 interfaces where eth0 is identified by IP address 10.0.0.1, eth1 by IO address 20.0.0.1, and eth2 by IO address 30.0.0.1. In the source edge device, a session(s) (or flows) may be associated to IP 10.0.0.1 while other session(s) (or flows) may be associated to IP 20.0.0.1. When the migrating VM1 to the destination edge device, the sessions associated with both 10.0.0.1 and 20.0.0.1 IP address are migrated, via the described network state synchronization system.

Generally, the edge device 226 monitors events provided by a workload orchestrator (not shown) or snoops packets to detect a migration trigger or the migration of a workload from a source device (e.g., the source host 210) where the host 220 is the destination host. In some embodiments, the edge device 226 detects a migration trigger in two different modes. In the first mode, the edge device 226 monitors the control plane for migration related events provided by the workload orchestrator. For example, the workload orchestrator may publish an event to start migration of a workload (e.g., WORKLOAD_MIGRATION_START). The workload orchestrator may publish other events such as an event to complete a migration or an event to abort a migration. In a second mode of detection, the edge device 226 snoops packets in the data plane to detect a migration trigger. For example, the edge device 226 may snoop for certain migration-related protocol packets to identify the migration of a workload. In some embodiments, a source device is identified as the source of context for a migrating workload based on the MAC address or IP address associated with the source device that are included in the snooped packets. In some embodiments, when the edge device 226 detects a migration trigger (via either mode), the migration of the workload is started.

In some embodiments, the network state associated with the workload to be migrated ("migrating workload") is synchronization between the source device and the destination device. In some embodiments to migrate the workload and associated network state, the destination device provides a request to the source device when a migration is detected (such as described above). In some embodiments, the destination device establishes a secured communication with the source device and requests network state information associated with each of the network interfaces used by the migrating workload.

In some embodiments, migration of a workload in edge devices is broadly classified into two stages. As a network state associated with a migrating workload may require a large amount of information transfer, the migration can be divided into multiple stages. In the first stage (Stage One), the workload state is transferred from the source edge device 216 to the destination edge device 226 while migrating workload may be active on the source device (when synchronizing, the workload might be on the source host or the workload could have been completely moved to the destination host while the network state synchronization is still happening on the destination edge device). In some embodiments, an active workload on an edge device is when active traffic is in effect to/from the workload, from the edge device. In the second stage (Stage Two), the network state is synchronized with deltas between the source edge device 216 and the destination edge device 226 when workload is ready to resume at the destination device 226 after being shut down on the source device 216.

Secure State Synchronization

Generally, to reduce packet loss and reduce disruption in traffic flow to the migrating workload, the transfer of the network state should be done as quickly as possible. The time required for network state transfer directly depends on number of active network flows and network activity of the migrating workload. In some embodiments, each flow has an associated network state and the state can change (delta) as long as workload is sending/receiving packet on that flow during migration. In some embodiments, the time taken for a session to be created in the destination edge device is one millisecond (ms). In some embodiments, the traffic disruption period depends on the number of sessions that are being modified in the window between the start of Stage One and end of Stage One. For example, assume 1000 active sessions in a migrating workload. In Stage One, the 1000 sessions are synchronized to the destination edge device. At the start of the Stage Two, if only 50 sessions have been altered, only these 50 sessions are re-synchronized to the destination edge device. As such, the traffic disruption window will be much smaller (e.g., 50 ms). When no sessions are altered at the start of Stage Two, then there is almost zero traffic disruption.

In some embodiment, this transfer is encrypted for security reasons via an encrypted connection established between the source edge device 216 and the destination edge device 226. In some embodiments, the destination edge device triggers the transfer of the network state information from the source node, which provides an advantage of extra security that can be performed for the requesting node (e.g., the destination edge device 226) for trusted nodes at the source edge device 216.

Workload Migration from Non-Intelligent Edge Device

In some embodiments, when a workload is migrating from a non-intelligent edge device, state synchronization is not requested to the source edge device. As such, all of the states will be newly learnt in the destination edge device. For the active flows that are connection trackable (e.g., TCP), those flows will be created without connection tracking information.

Exemplary Process

Figure 3:
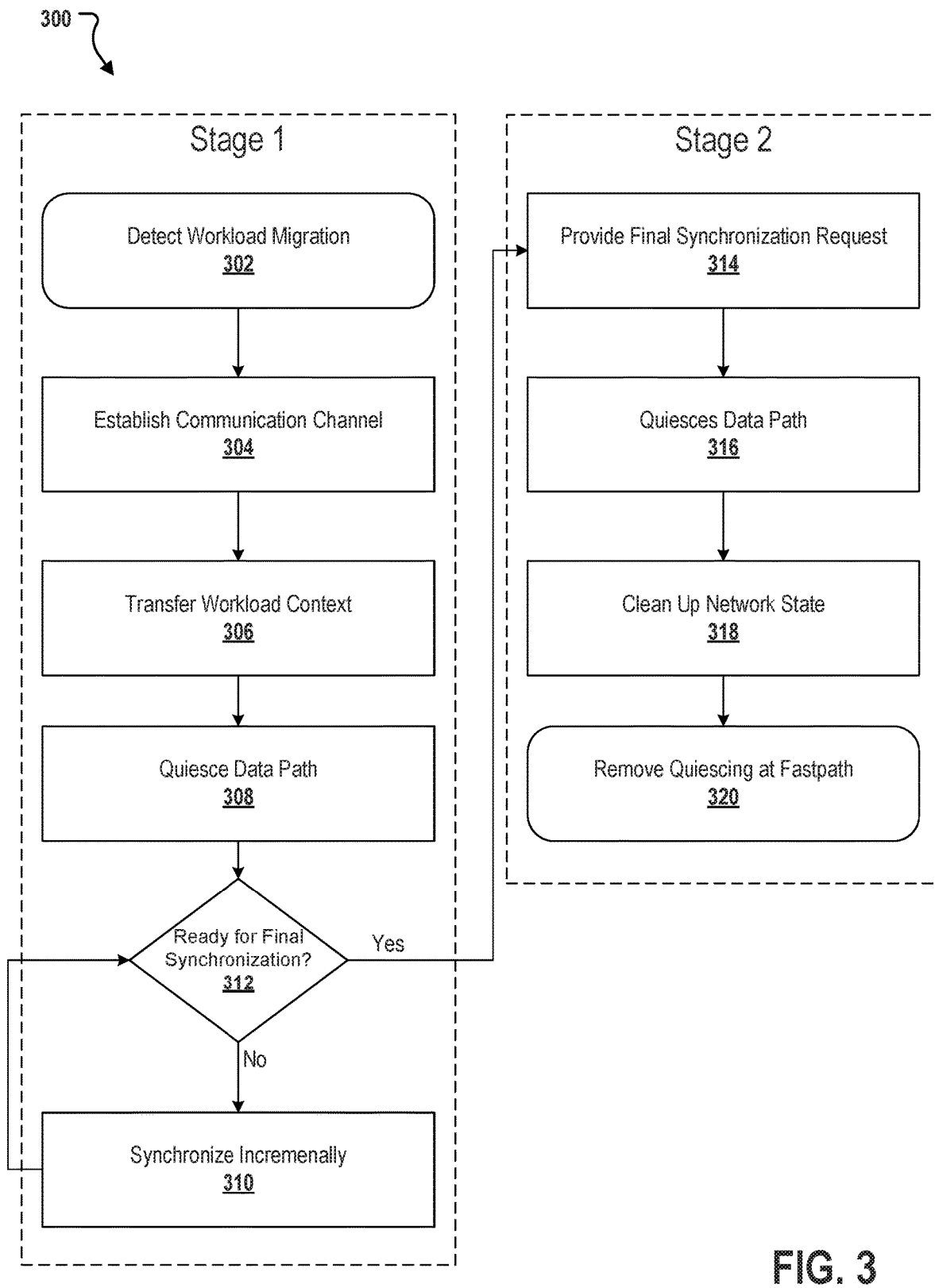
FIG. 3 depicts a flowchart of non-limiting exemplary process that can be implemented by embodiments of the present disclosure.

FIG. 3 depicts a flowchart of an example process 300. The example process 300 can be implemented by the various elements of the described system. As depicted, the example process shows in more detail migrating a workload from a source edge device to a destination edge device. For clarity of presentation, the description that follows generally describes the example process 300 in the context of FIGS. 1, 2, and 4A-6. However, it will be understood that the process 300 may be performed, for example, by any other suitable system, environment, software, and hardware, or a combination of systems, environments, software, and hardware as appropriate. In some embodiments, various operations of the process 300 can be run in parallel, in combination, in loops, or in any order. In some embodiments, the process 300 is executed by an edge device. In some embodiments, the edge device is a smartNIC. In some embodiments, the edge device is a router or a switch. In some embodiments, the edge device is an appliance device configured to perform, for example, firewall or load balancing functionalities. In some embodiments, the edge device includes a memory unit having instructions stored thereon which, when executed by the edge device, cause the edge device to perform the process 300.

As described above, FIG. 3 depicts the various steps in both Stage One and Stage Two of a migration. Generally during Stage One, the migrating workload is still active on the source edge device, and active flow transactions are in effect to/from the workload, from the source edge device. Stage Two is performed while the migrating workload is activated on the destination device, and thus ready to resume its network communication. As depicted, Stage One includes steps 302-310 while Stage Two includes steps 314-320. The decision 312 shows the transition from Stage One to Stage Two.

At 302, a start migration trigger is received by a destination edge device. The trigger can be a result of, for example, a notification from an external workload orchestrator. Alternatively, at step 302, a destination edge device detects a migration trigger for the workload from network packets that the edge device is actively snooping. At 304, a secure and reliable communication channel is establishment with the source edge device. For example, using TCP will ensure reliable, in-order-packet delivery.

At 306, the workload state associated with the migrating workload is transferred from the source edge device to the destination edge device via the established communication channel. In some embodiments, for example, the destination edge device provides a request for the workload state/context to the source edge device and the source edge device provides a response with the requested information. At 308, based on the received workload state/context information, the destination edge device quiesces a datapath for processing the flows associated with the migrating workload and caches workload state synchronization information that is received from the source edge device such that it does not affect the forwarding, policy, security decisions on the destination node. Steps 306 and 308 are referred to herein as an "initial synchronization" of the network state.

At 310, the network state is incremental synchronized (e.g., via a delta of the network state since the last update) between the source edge device and destination edge device on completion of the initial synchronization. Step 310 is referred to herein as the "incremental synchronization." For example, any incremental changes (from the initial or previous synchronization operation) to the network state (e.g., changes to the workload state information) is provide to the destination node form the source node. In some embodiments, the source edge device periodically provides the incremental changes to the destination edge device. In some embodiments, the destination edge device updates the data path based on the received incremental changes; however, in some embodiments, the synchronized workload context information in the datapath will not be used until the completion of Stage Two of migration. In some embodiments, the destination edge device periodically provides a request for the incremental changes to the source node.

At decision 312, the network state is synchronized between the source destination device and the source destination device incremental until the workload migration is complete (e.g., based on the detection of a workload migration completion event). In some embodiments, a workload migration completion event includes receiving a migration completion event notification from the workload orchestrator or receiving the first packet related to the migrating workload (e.g., a gratuitous Address Resolution Protocol (ARP)/ARP/Dynamic Host Configuration Protocol (DHCP) packet) at the datapath from the host.

At 314, the destination edge device provides a final synchronization request to the source edge device when the destination edge node is ready to resume/activate the migrating workload. At 316, the source edge device quiesces the datapath from further processing of the packets for the workload and transfers a final delta from the last updated network state to the destination edge device. In some embodiments, this latest network state includes the incremental information for the network context if modified since the earlier transfer.

At 318, the network state associated with the workload is cleaned up on the source edge device. For example, the source edge device may delete all the sessions, flows, and workload context on the completion of Stage Two.

At 320, the destination edge device removes quiescing (e.g., at fastpath) and thus facilitates the use of the synchronized network state, which includes network protocols, firewall policies and network security, on the device. For example, traffic to/from the migrating workload can be dropped in the datapath (or fastpath) to ensure that the traffic does not alter the session/flow information. In some embodiments, quiescing is performed in Stage Two in the source edge device because, in Stage One, the migrating workload may be still active in source edge device and handling active traffic. In some embodiments, quiescing is performed in Stage One in the destination edge device (e.g., at the start of the migration). Steps 314 to 320 are referred to herein as an "final synchronization" of the network state.

Migration State Machines

Figure 4A:
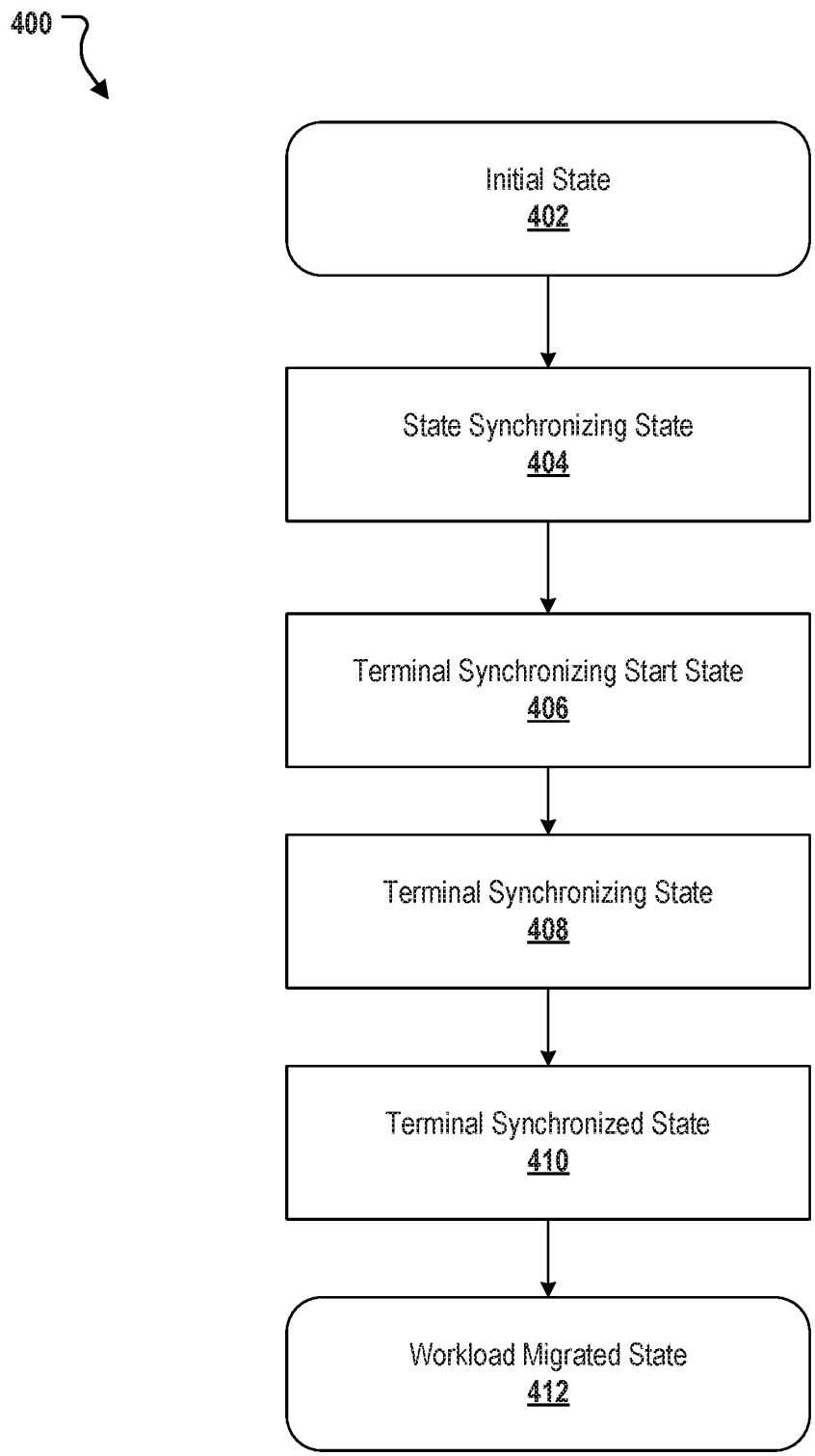
FIGS. 4A and 4B each depict a flowchart for exemplary state machines that can be executed via the described system.
Figure 4B:
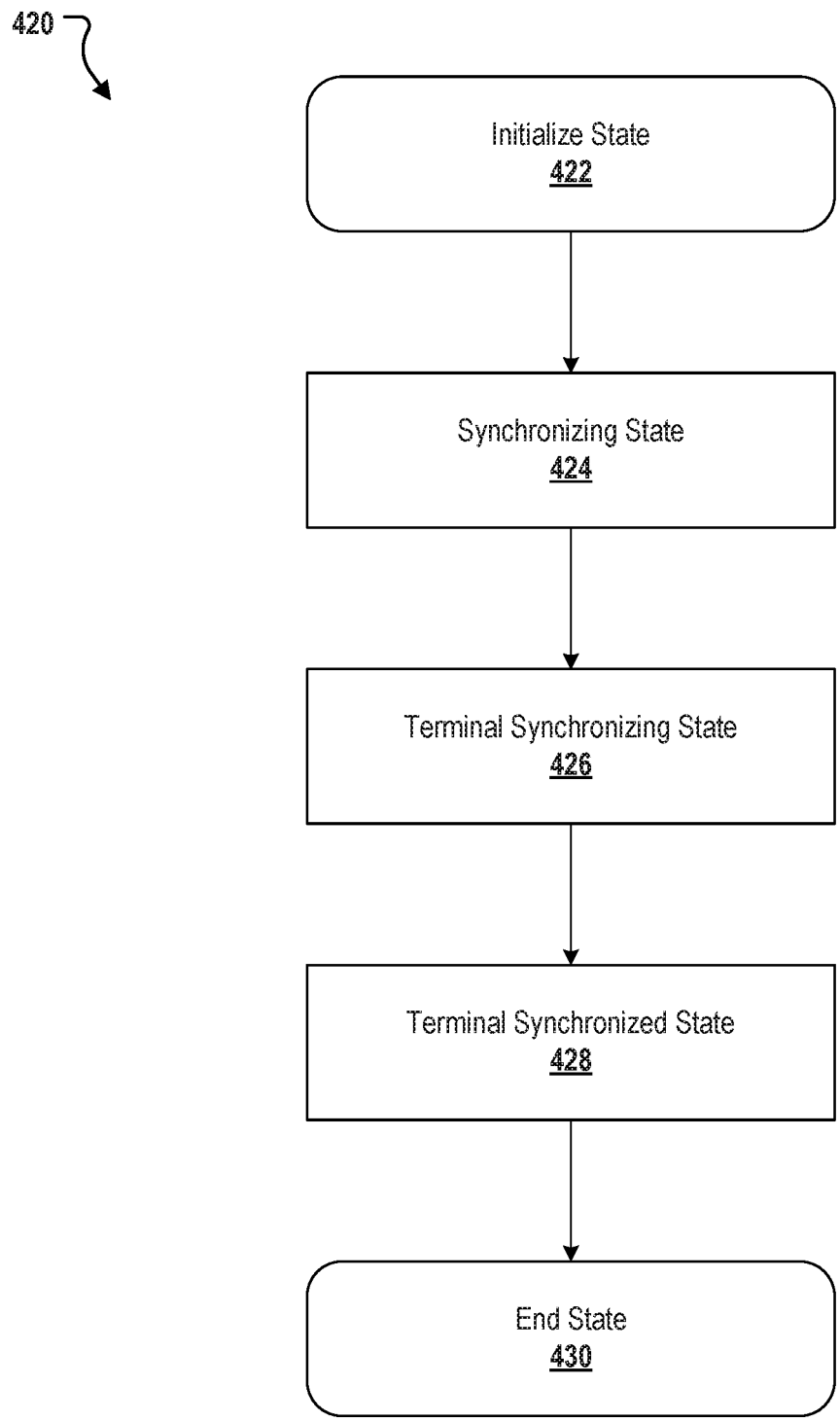

FIGS. 4A and 4B each depict a flowchart for example state machines 400 and 420 respectively that can be executed via the described system. The example state machines 400 and 420 can be implemented by the various elements of the described system. For example, the state machine 400 can be executed by a destination edge device, such as the destination edge device 226 depicted in FIG. 2 while the state machine 420 can be executed by a source edge device, such as the source edge device 216 depicted in FIG. 2. In some embodiments, the destination edge device or the source edge device is a smartNIC. In some embodiments, the destination edge device or the source edge device is an appliance. For clarity of presentation, the description that follows generally describes the state machines 400 and 420 in the context of FIGS. 1-3, 5, and 6. However, it will be understood that the state machines 400 and 420 may be performed, for example, by any other suitable system, environment, software, and hardware, or a combination of systems, environments, software, and hardware as appropriate.

For state machine 400, at 402, the destination edge device enters an initial state at the start of migration of a workload to the destination edge device based on, for example, the detection of a migration trigger. As described in FIG. 3, a secure and reliable communication channel is established with the source edge device and synchronization of the network state associated with the migrating workload is requested. Datapath quiescing (e.g., at fastpath) for the workload will be in effect. From state 402, the destination device proceeds to state 404.

At 404, the destination edge device enters a state synchronizing state when the workload content synchronizing information is received from the source edge device. In some embodiments, the destination edge device remains in this state on receiving either the initial synchronizing information or incremental synchronizing information. From state 404, the destination device proceeds to state 406.

At 406, the destination edge device enters a terminal synchronizing start state when any one of the triggers to Stage Two occurs for the workload. For example, the destination edge device enters this state when a migration completion trigger is received from the workload orchestrator or when receiving, by snooping the datapath a first packet (e.g., a gratuitous ARP/ARP/DHCP packet) from the migrating workload. In this state, in some embodiments the destination edge device requests the start of a final state synchronization from the source edge device. From state 406, the destination device proceeds to state 408.

At 408, the destination edge device enters a terminal synchronizing state upon receiving a terminal synchronize message from the source edge device. In this state, for example, the received final workload context synchronization is created in the datapath at the destination edge device. From state 408, the destination device proceeds to state 410.

At 410, the destination edge device enters a terminal synchronized state upon the completion of the terminal synchronization of the network state from the source edge device. In some embodiments, the destination edge device sends an ACK message for handling of terminal synchronization messages. From state 410, the destination device proceeds to state 412.

At 412, the destination edge device enters a workload migrated state when it receives a completion of workload clean up event from the source edge device. In some embodiments, this workload clean up event signifies that the source edge device has completed all the workload migration operation and cleaned up the workload context information. In the workload migrated state, the destination edge device is ready to take over all the data path forwarding operation for the workload. In some embodiments, the destination edge device holds any network packets sent by the migrating workload in an internal queue until it enters in this state. Also, upon entry of this state by the destination edge device, any traffic packets that were held up by the destination edge device are allowed to go out to the network. In some embodiments, an acknowledgement that the workload has been migrated is provided to the source edge device, which completes the migration process on the destination edge device. From state 412, the destination device proceeds to an end state (not shown).

For state machine 420, at 422 the source edge device enters an initial state when a reliable and secured connection is established from the destination edge device. From state 422, the source device proceeds to state 424.

At 424, the source edge device enters a synchronizing state upon receiving a synchronization request from the destination edge device. In this state, the complete network state (e.g., protocol/policy/security) maintained for the migrating workload is sent to the destination edge device. In some embodiments, periodic incremental synchronization for the modified context/state is initiated in this state as well. From state 424, the source device proceeds to state 426.

At 426, the source edge device enters a terminal synchronizing state upon receiving a terminal synchronization request from the destination edge device. In this state, the final synchronization for all network state information, which includes a delta for the network state since the previous synchronization provided to the destination edge device, is provided to the destination edge device. In some embodiments, datapath quiescing (e.g., at fastpath) for the migrating workload is installed on the source edge device. From state 426, the source device proceeds to state 428.

At 428, the source edge device enters a terminal synchronized state when the complete synchronization of the network state is provided to the destination edge device. In some embodiments, a terminal synchronization message is provided to the destination edge device once the network state information has been provided to the destination edge device. From state 428, the source device proceeds to state 430.

At 430, the source edge device enters an end state and sends the workload cleanup event to the destination device when an acknowledgement for the terminal synchronization message is received from the destination edge device. In some embodiments, an acknowledgement that the workload has been migrated (e.g., the workload clean up event) is received from the destination device, which completes the migration process on the source edge device.

Computer Systems

Figure 5:
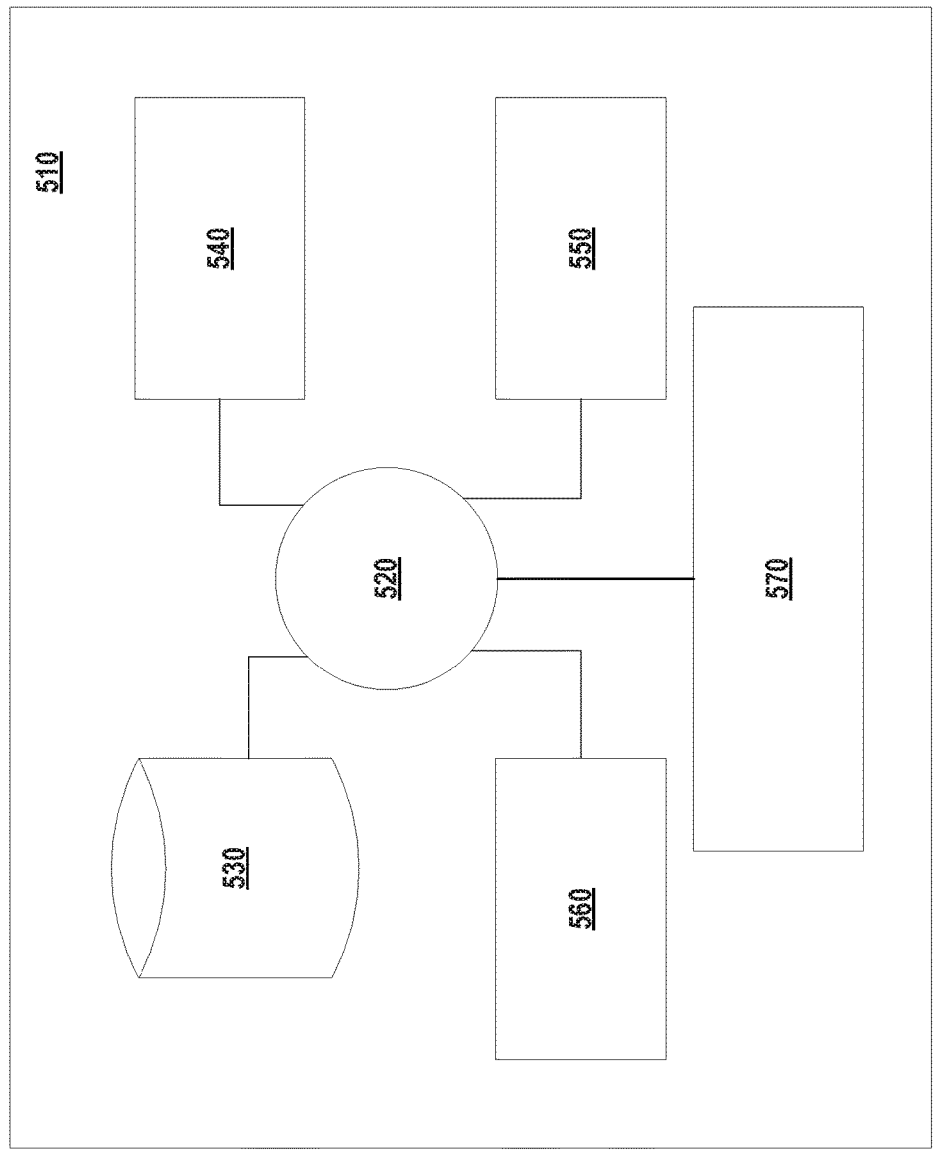
FIG. 5 depicts a non-limiting example computer system that can be programmed or otherwise configured to implement methods or systems of the present disclosure.
Figure 5:
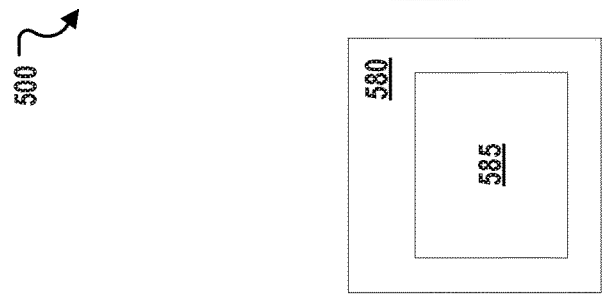

Computer systems are provided herein that can be used to implement methods or systems of the disclosure. FIG. 5 depicts an example a computer system 500 that can be programmed or otherwise configured via the various components to implement methods or systems of the present disclosure. For example, the IO subsystem 570 can be programmed to provide or received a workload state for a migrating workload. As depicted, the computer system 500 includes a computing device 510 and an optional electronic display 580. In some embodiments, the computing device 510 is substantially similar to the computing system 120 depicted in FIG. 1.

In the depicted embodiment, the computing device 510 includes a CPU (also "processor" and "computer processor" herein) 520, which is optionally a single core, a multi core processor, or a plurality of processors for parallel processing. The computing device 510 also includes memory or memory location 530 (e.g., random-access memory, read-only memory, flash memory); electronic storage unit 540 (e.g., hard disk); communication interface 550 (e.g., network adapter) for communicating with one or more other systems; peripheral devices 560 (e.g., cache, other memory, data storage or electronic display adapters), and IO subsystem 570 (e.g., edge device, such as a smartNIC). The memory 530, the electronic storage unit 540, the communication interface 550, the peripheral devices 560, and the IO subsystem 570 are in communication with the CPU 520 through a communication bus (solid lines), such as a motherboard.

In some embodiments, the CPU 520 can execute a sequence of machine-readable instructions, which can be embodied in a program or software. The instructions may be stored in a memory location, such as the memory 530. The instructions can be directed to the CPU 520, which can subsequently program or otherwise configure the CPU 520 to implement methods of the present disclosure. Examples of operations performed by the CPU 520 can include fetch, decode, execute, and write back. In some embodiments, the CPU 520 is part of a circuit, such as an integrated circuit. One or more other components of the computing device 510 can be optionally included in the circuit. In some embodiments, the circuit is an ASIC or a Field Programmable Gate Array (FPGA).

In some embodiments, the IO subsystem 570 (e.g., the above described edge device) comprises an expansion card, such as a smartNIC, that is connected with the CPU 520 via PCIe. In some embodiments, the IO subsystem 570 is completely programmable ASIC engine programed to provide implementations of the systems and methods described herein.

In some embodiments, the electronic storage unit 540 includes a data storage unit (or data repository) for storing data. In some embodiments, the electronic storage unit 540 stores files, such as drivers, libraries, images, and saved programs. In some embodiments, the electronic storage unit 540 stores user data, e.g., user preferences and user programs. In some embodiments, the computing device 510 includes one or more additional data storage units that are external, such as located on a remote server that is in communication through an intranet or the internet.

The computing device 510 is optionally operatively coupled to a network with the aid of the communication interface 550. A network may include a local area network (LAN), wide area network (WAN), the Internet, or a combination thereof, and connects computing devices. In some embodiments, the computing device 510 communicates with one or more remote computer systems through the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 510 via a network.

In some embodiments, methods as described herein are implemented by way of machine (e.g., computer processor) executable code stored on an electronic storage location of the computing device 510, such as, for example, on the memory 530 or the electronic storage unit 540. In some embodiments, the CPU 520 is adapted to execute the code. In some embodiments, the machine executable or machine-readable code is provided in the form of software. In some embodiments, during use, the code is executed by the CPU 520. In some embodiments, the code is retrieved from the electronic storage unit 540 and stored on the memory 530 for ready access by the CPU 520. In some situations, the electronic storage unit 540 is precluded, and machine-executable instructions are stored on the memory 540. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 510 can include or be in communication with the electronic display 580. In some embodiments, the electronic display 580 provides a user interface (UI) 585.

Processing Devices and Processors

In some embodiments, the platforms, systems, media, and methods described herein include a computer, or use of the same. In further embodiments, the computer includes one or more hardware CPUs or general purpose graphics processing units (GPGPUs) that carry out the device's functions by providing chains of operation to an IO subsystem provided through a SmartNIC connected to the CPU or GPGPU via PCIe. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc (CD)-Read only Memories (ROMs), Digital Versatile Disks (DVDs), flash memory devices, magnetic disk drives, magnetic tapes drives, optical disk drives, and cloud computing-based storage. In further embodiments, the storage and/or memory device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. In some embodiments, a computer program includes a sequence of instructions, executable in the computer's CPU or in the processors of an IO subsystem, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

While preferred embodiments of the present subject matter have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments of the subject matter described herein may be employed in practicing the described system.

What is claimed is:

1. An edge device configured to execute instructions that cause the edge device to perform operations to migrate a workload, the operations comprising:
   receiving a migration trigger comprising an indication of a migration of a workload from a source edge device to a destination host computing system, wherein the source edge device is a first smart network interface card (SmartNIC) interfacing with a source host computing system;
   establishing a secure communication channel with the source edge device;
   receiving a network state for the workload from the source edge device via the secure communication channel and maintaining, by the edge device, the network state for the workload;
   quiescing a datapath for processing flows associated with the workload based on the received network state;
   receiving incremental deltas comprising changes to the network state from the source edge device via the secure communication channel;
   updating, by the edge device, the datapath for processing the flows associated with the workload based on the received incremental changes;
   providing, to the source edge device via the secure communication channel, a request for a final synchronization;
   receiving, from the source edge device via the secure communication channel, a final synchronization delta comprising incremental information for the network state as modified since the most recently received incremental change; and
   removing, by the edge device, the quiescing of the datapath to facilitate use of the network state by receiving traffic packets from the migrated workload, wherein the edge device is a second smartNIC interfacing with the destination host computing system.

2. The edge device of claim 1, wherein the operations comprise: after removing the quiescing of the datapath, allowing any held up traffic packets from the migrated workload out to a network.

3. The edge device of claim 1, wherein the migration trigger is received by processing network packets in the data plane by the edge device.

4. The edge device of claim 3, wherein the network packets comprises attributes associated with the source edge device, and wherein the operations comprise identifying the source edge device based on the attributes associated with the source edge device.

5. The edge device of claim 4, wherein the attributes comprise a media access control (MAC) address or an internet protocol (IP) address, associated with the source edge device.

6. The edge device of claim 1, wherein the migration trigger is received from a workload orchestrator.

7. The edge device of claim 6, wherein the workload orchestrator provides control information for the workload via the control plane.

8. The edge device of claim 1, wherein the operations comprise: providing, to the source edge device, an acknowledgement that the workload has been migrated.

9. The edge device of claim 1, wherein the operations comprise:
   after receiving the final synchronization delta, providing, to the source edge device via the secure communication channel, an ACK message.

10. The edge device of claim 1, wherein the maintaining the network state for the workload by the edge device comprises storing, the network state in a memory of the edge device.

11. The edge device of claim 1, wherein the network state comprises policy state data, security state data, flow state data, stateful firewall data, and connection tracking information for each of the flows.

12. The edge device of claim 1, wherein one or more interfaces are mapped to the workload, wherein each of the one or more interfaces comprise a context for the workload, and wherein the network state comprises each of the contexts.

13. An edge device configured to execute instructions that cause the edge device to perform operations to migrate a workload, wherein the edge device is a first smart network interface card (SmartNIC) interfacing with a source host computing system, the operations comprising:

receiving a synchronization request for a workload from a destination edge device, wherein the workload is to be migrated to a destination host computing system interfacing with the destination edge device, and wherein the destination edge device is a second smartNIC;

establishing a secure communication channel with the destination edge device;

providing a network state for the workload to the destination edge device via the secure communication channel, wherein the network state is to be received and maintained by the destination edge device;

providing incremental deltas comprising changes to the network state to the destination edge device via the secure communication channel;

receiving a request for a final synchronization from the destination edge device via the secure communication channel;

quiescing a datapath for processing flows associated with the workload;

providing, to the destination edge device via the secure communication channel, a final synchronization delta comprising incremental information for the network state as modified since the most recently received incremental change; and deleting any sessions, flows, and workload context, associated with the workload.

14. The edge device of claim 13, wherein the operations comprise: after providing the final synchronization delta to the destination edge device, receiving an ACK message from the destination edge device via the secure communication channel.

15. The edge device of claim 13, wherein the network state comprises policy state data, security state data, flow state data, stateful firewall data, and connection tracking information for each of the flows associated with the workload.

16. The edge device of claim 13, wherein the synchronization request is provided by the destination edge device based on a migration trigger received from a workload orchestrator of the destination edge device, and wherein the workload orchestrator provides control information for the workload via the control plane.

17. A network state synchronization system comprising:
a source edge device comprising a first smart network interface card (SmartNIC) interfacing with a source host computing system,
a destination edge device comprising a second smartNIC interfacing with a destination host computing system;
wherein the destination edge device is configured to:
receive a migration trigger comprising an indication of a migration of a workload from the source edge device to the destination host computing system;
provide a synchronization request for the workload to the source edge device;
establish a secure communication channel with the source edge device;
receive a network state for the workload from the source edge device via the secure communication channel and maintain, by the edge device, the network state for the workload;
quiesce a destination datapath for processing flows associated with the workload based on the received network state;
receive incremental deltas comprising changes to the network state from the source edge device via the secure communication channel;
update the destination datapath for processing the flows associated with the workload based on the received incremental changes;
provide, to the source edge device via the secure communication channel, a request for a final synchronization;
receive, from the source edge device via the secure communication channel, a final synchronization delta comprising incremental information for the network state as modified since the most recently received incremental change; and
remove the quiescing of the destination datapath to facilitate use of the network state by receiving traffic packets from the migrated workload, and
wherein the source edge device is configured to:
receive the synchronization request for the workload from the destination edge device;
establish the secure communication channel with the destination edge device;
provide the network state for the workload to the destination edge device via the secure communication channel;
provide the incremental deltas to the destination edge device via the secure communication channel;
receive the request for a final synchronization from the destination edge device via the secure communication channel;
quiesce a source datapath for processing the flows associated with the workload;
provide, to the destination edge device via the secure communication channel, the final synchronization delta; and
delete any sessions, flows, and workload context, associated with the workload.

18. A method for migrating a workload, the method executed by an edge device and comprising:
receiving a migration trigger comprising an indication of a migration of a workload from a source edge device to a destination host computing system, wherein the source edge device is a first smart network interface card (SmartNIC) interfacing with a source host computing system;
establishing a secure communication channel with the source edge device;
receiving a network state for the workload from the source edge device via the secure communication channel and
maintaining, by the edge device, the network state for the workload;
quiescing a datapath for processing flows associated with the workload based on the received network state;
receiving incremental deltas comprising changes to the network state from the source edge device via the secure communication channel;
updating, by the edge device, the datapath for processing the flows associated with the workload based on the received incremental changes;
providing, to the source edge device via the secure communication channel, a request for a final synchronization;
receiving, from the source edge device via the secure communication channel, a final synchronization delta comprising incremental information for the network state as modified since the most recently received incremental change; and removing, by the edge device, the quiescing of the datapath to facilitate use of the network state by receiving traffic packets from the migrated workload, wherein the edge device is a second smartNIC interfacing with the destination host computing system.

19. The method of claim 18 comprising:

after removing the quiescing of the datapath, allowing any held up traffic packets from the migrated workload out to a network.

20. The method of claim 18, wherein the migration trigger is received by processing network packets in the data plane by the edge device.

21. The method of claim 20, wherein the network packets comprises attributes associated with the source edge device, and wherein the method comprises identifying the source edge device based on the attributes associated with the source edge device.

22. The method of claim 21, wherein the attributes comprise a media access control (MAC) address or an internet protocol (IP) address, associated with the source edge device.

23. The method of claim 18, wherein the migration trigger is received from a workload orchestrator of the edge device.

24. The method of claim 23, wherein the workload orchestrator provides control information for the workload via the control plane.

25. The method of claim 18 comprising: providing, to the source edge device, an acknowledgement that the workload has been migrated.

26. The method of claim 18 comprising:

after receiving the final synchronization delta, providing, to the source edge device via the secure communication channel, an ACK message.

27. The method of claim 18, wherein maintaining the network state for the workload comprises storing, the network state in a memory of the edge device.

28. The method of claim 18, wherein the network state comprises policy state data, security state data, flow state data, stateful firewall data, and connection tracking information for each of the flows.

29. The method of claim 18, wherein one or more interfaces are mapped to the workload, wherein each of the one or more interfaces comprise a context for the workload, and wherein the network state comprises each of the contexts.

30. A method for migrating a workload, the method executed by an edge device, the edge device is a first smart network interface card (SmartNIC) interfacing with a source host computing system, the method comprising:

receiving a synchronization request for a workload from a destination edge device, wherein the workload is to be migrated to a destination host computing system interfacing with the destination edge device, and wherein the destination edge device is a second smartNIC;

establishing a secure communication channel with the destination edge device;

providing a network state for the workload to the destination edge device via the secure communication channel;

providing incremental deltas comprising changes to the network state to the destination edge device via the secure communication channel, wherein the network state is to be received and maintained by the destination edge device;

receiving a request for a final synchronization from the destination edge device via the secure communication channel;

quiescing a datapath for processing flows associated with the workload;

providing, to the destination edge device via the secure communication channel, a final synchronization delta comprising incremental information for the network state as modified since the most recently received incremental change; and deleting any sessions, flows, and workload context, associated with the workload.

31. The method of claim 30 comprising: after providing the final synchronization delta to the destination edge device, receiving an ACK message from the destination edge device via the secure communication channel.

32. The method of claim 30, wherein the network state comprises policy state data, security state data, flow state data, stateful firewall data, and connection tracking information for each of the flows associated with the workload.

33. The method of claim 30, wherein the synchronization request is provided by the destination edge device based on a migration trigger received from a workload orchestrator, and wherein the workload orchestrator provides control information for the workload via the control plane.

* * * * *